Figure 1:
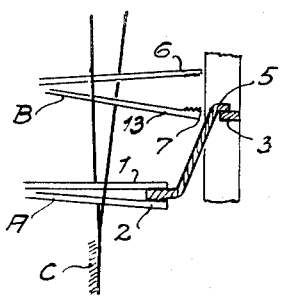

Dec. 30, 1952 S. S. C. FLEISCHER ET AL 2,623,546
METHOD AND APPARATUS FOR WEAVING PILE FABRICS
Filed March 30, 1948 4 Sheets-Sheet 1

INVENTORS
Svend Sigurd Christie Fleischer
Christen Carl Thomsen
By Richardson, Davis and Modon their ATTYS.

Dec. 30, 1952     S. S. C. FLEISCHER ET AL     2,623,546
METHOD AND APPARATUS FOR WEAVING PILE FABRICS
Filed March 30, 1948                4 Sheets—Sheet 2
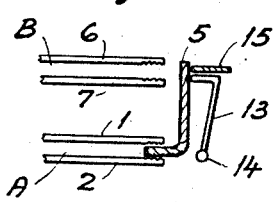
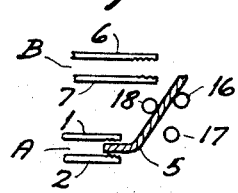
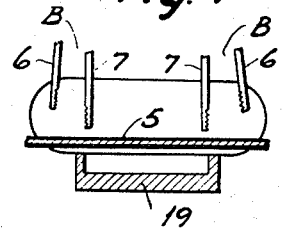
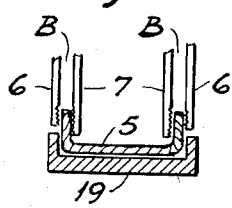
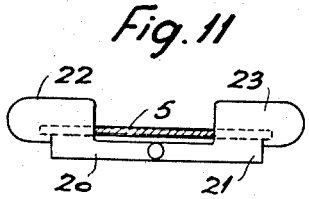
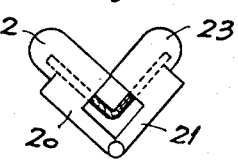
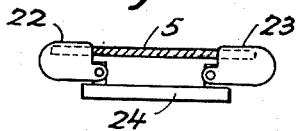
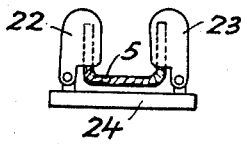
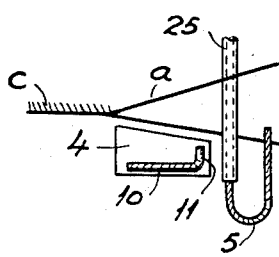
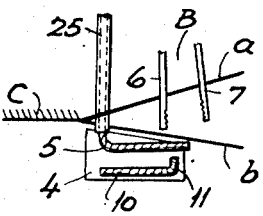
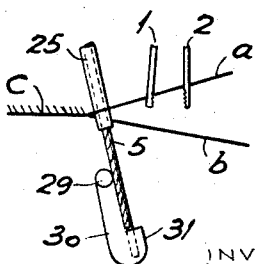
INVENTORS
Svend Sigurd Christie Fleischer
Christen Carl Thomsen
By Richardson, Davis and Nydon their ATTYS.

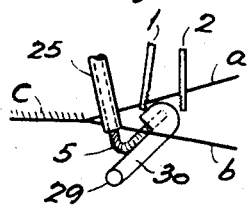
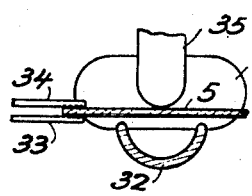
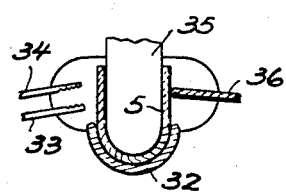
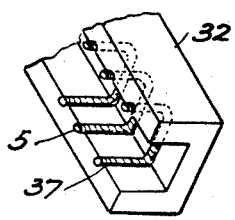
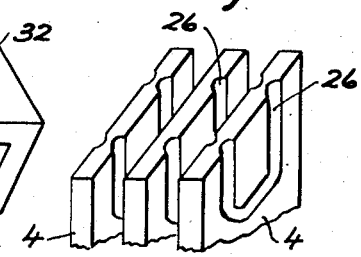
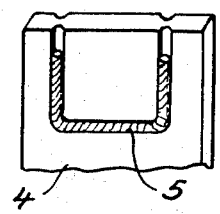
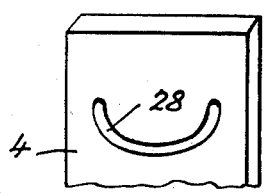
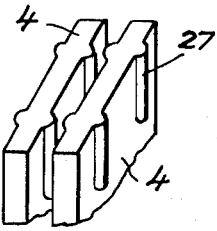
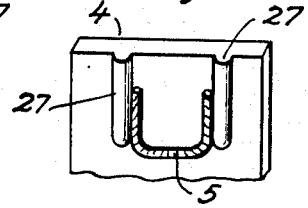
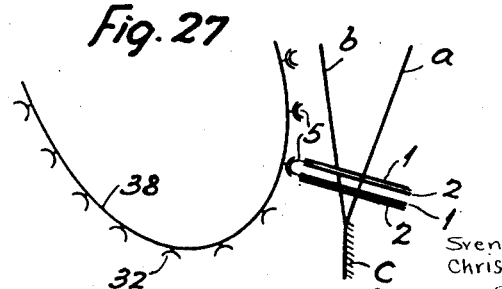

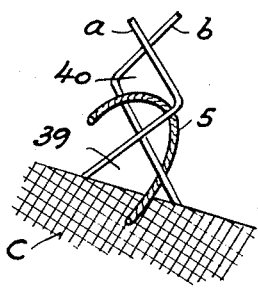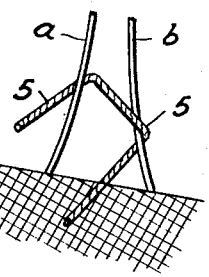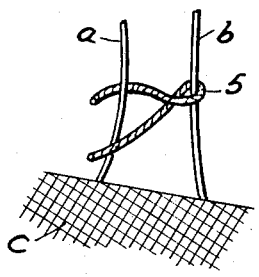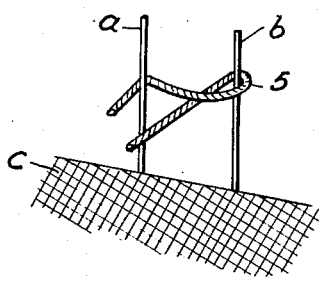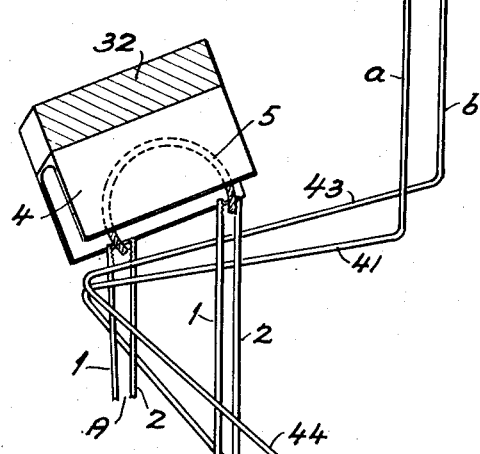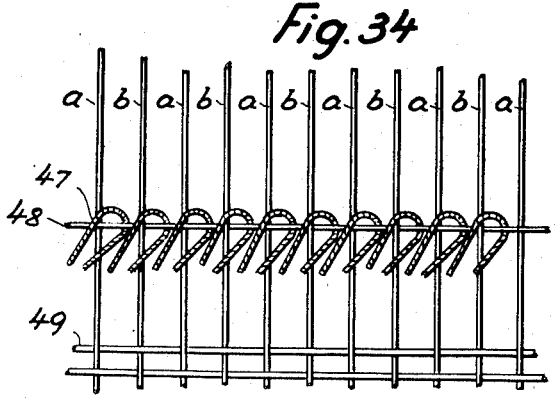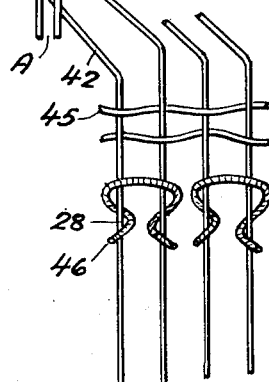

Patented Dec. 30, 1952

2,623,546

UNITED STATES PATENT OFFICE 2,623,546

METHOD AND APPARATUS FOR WEAVING PILE FABRICS

Svend Sigurd Christie Fleischer, Charlottenlund, and Christen Carl Thomsen, Hellerup, Denmark Application March 30, 1948, Serial No. 18,008
In Denmark April 9, 1947

26 Claims. (Cl. 139—4)

The present invention relates to a method for weaving of carpets and other textile items with a pile of the nature where the pile thread is curved only by means of mechanical contrivances independent of the textile item. The characteristic of the invention consists therein that, before, during, or after being cut off, the pile thread is so curved or bent that at least one part of the preferably bent pile thread is grasped by a gripping member, carried through the textile shed in such a manner that the part, the end of the pile thread respectively, will be positioned chiefly in the longitudinal direction of the gripping member in question, or chiefly across the part of the thread of the item, through which the gripping member is carried.

On the basis of this method it is possible to design looms characterized by their simple, reliable mechanism allowing a rapid weaving of pipe carpets, the pile threads of which are tied as Turkish or Persian knots, or are merely forming V-shaped loops. Pile threads of any desired lengths may be employed. During the insertion of a pile thread, one or both of the ends may, according to the invention, be clamped by a single, or each one by its own, gripping member, until the pile thread has been drawn through, or finally tied, or inter-woven. The looms may have open or closed reeds, and according to the invention the total number of knots in a row of knots may be tied simultaneously, whereby a rapid weaving is obtained. A finer weaving may be attained in the case where, according to the invention, only a fraction of the knots in a row of knots are tied at a time, as no knots are tied in any desired long intervals between the knots tied, whereby more space is obtained for the gripping member during the insertion of the pile threads. It is frequently suitable, during the insertion of the pile threads, to keep one or more groups of the warp yarns in the textile shed more or less slack, as an irregular weaving may be obtained in this way, which is frequently desired.

In looms according to the invention the pile threads are bent, as mentioned, without the cooperation of the yarns of the textile item. This is accomplished, according to the invention, by means of a device which bends the pile threads against a counterrest, which may be stationary, so that a free end of the pile thread, during or after its bending, may be carried into the open jaws of, or be nipped by the gripping member. This member may, for instance, be pressed against the middle part of the side of the pile thread facing the textile item in such a manner that a free end of the pile thread, which is at any rate partly abutting on the counterrest, and the other end of which may be firmly held by a gripping member, is influenced to swing into the direction of the textile item; or the free end of the pile thread may, by means of another, suitable member influencing the side opposing the textile item, be pushed into the same direction.

The bending member may, according to the invention, consist of a part of a gripping member or of a pushing device chiefly reciprocating in relation to the main direction of movement of the gripping member. Additionally, the bending member may consist of hinged jaws or of a sliding device movable in the same direction as the gripping system and in the direction at a right angle to the gripping system, around which pushing device it is bent.

The counterrest, against which the pile thread is bent, may be resilient. It will frequently be in the shape of a bar and may stretch along the textile item parallel to the weft direction close to the transition from the textile shed to the woven cloth.

For the guiding of the pile threads, while they are placed into and still are situated within, the counterrest bar, it is suitable to provide this bar with lamellae between which the pile threads may be placed singly or in groups. The interspaces between the lamellae may also be made so narrow pressure is required on the threads in order to push them into the lamellae, in which case the latter alone may be employed as counterrests. In other words, the pile thread is frictionally supported between the lamellae during the bending and gripping sequence. The lamellae, in some forms of the invention, comprise spaced plates or discs which are secured to the counterrest and are spaced apart a distance just sufficient to frictionally support a pile thread between them.

In order to improve the gripping of the pile threads in the position desired between the lamellae, throughcuts may possibly be provided in the latter, into which the pile thread will escape when being pressed. Also, the lamellae may be provided with projections, behind or around which the pile thread will place itself during the insertion.

As already mentioned, the counterrest may be permanently arranged close to the transition from the textile shed to the cloth already woven, so that both the introduction of the pile threads into the counterrest, as well as their extraction herefrom, is performed in said position. It may, however, frequently be suitable to employ a portable counterrest into which the pile threads may be introduced, while the rest in question is found at a special feeding station, after which the counterrest is moved to the said position—the extraction position—at the textile shed, where the gripping members extract the pile threads. By the portable counterrest the advantage is gained that the whole loom is far more easily inspected, and its different parts are more conveniently accessible, and also the weaving will be more rapidly performed.

According to the invention, the portable counterrest may suitably be designed as a bar- or chain-system, into which the pile threads can be introduced, preferably while being bent. The placing of the pile threads is preferably performed in series at the feeding station, which may have the same width as the textile item. A part of the portable counterrest system, for instance a bar or a part of an endless chain, is located in front of the feeding station, from which latter the pile threads are transferred to the part in question of the counterrest system, which is nextly placed in the extraction position at the textile shed.

The portable counterrest system may, as mentioned, be designed as an endless chain carrying the pile threads, or as one or more bars, which may be of a length corresponding to the width of the textile item, and which may, for instance, be gradually carried into their position at the feeding station and at the textile item, while being carried forward in their longitudinal direction. This motion requires, however, a relatively long period of time, as the chain or the bars are to be carried forward in possibly the entire width of the textile item. It may consequently be suitable to introduce individual parts of the chain or of the bars in such a manner that at least the latter part of the motion in the direction toward the extraction position, and possibly also in the direction toward the feeding station, is performed across their longitudinal direction. The parts in question of the counterrest system may in this way, close to the feeding- and extraction-position, be carried forward in short, rapid steps, while otherwise they may be carried continuously or step-wise forward. To this purpose, inclined planes may suitably be arranged along which the parts of the portable counterrest system will slide down toward the feeding- or extraction-station, while the feeding and extraction are performed. To the same purpose, any desired suitable, mechanical conveyors may be employed. The bars may, for instance, be suspended in rows in endless conveyor-chains in such manner that, during their transport, they are kept parallel to the main plane of the textile item. Precautions may be taken in order to move the conveyor-chains step-wise forward at least at the feeding station and at the extraction position, while the conveyor-chains move continuously during their entire travel, and to arrange the bars so as to be removable in such manner that they may be carried by the conveyor-chains to the vicinity of the feeding- and extraction-positions where, by means of special members, they are carried into the said positions proper in order to rest stationary, while they are filled and emptied, after which they are once more removed into the continuously travelling conveyor-chains.

At the feeding station the pile threads may, according to the invention, be removed from a yarn magazine by means of a gripping- or loading-device of any desired suitable nature, which carries the pile thread across the counterrest bar. At this place, the pile thread can be carried into the counterrest bar by means of a member reciprocating in relation to the latter, for instance a plunger, after which the said member is retracted.

The ends of the pile thread may be apt to twist to a certain degree, so that they are not easily grasped by the gripping members. It is therefore suitable to arrange members for the straightening of the ends of the pile threads, for instance such as will push the ends upwards along the plunger in the moving direction of the latter, before it is withdrawn from the counterrest bar. The pushing may be performed by means of mechanical pushing devices of a suitable, possibly stationary, nature. To this purpose may, for instance, be employed the gripping or loading device mentioned, and in the same object may also be applied an air current blowing the ends of the pile threads upwards into the said direction.

A stationary counterrest may, according to the invention, contain two, possibly separate parts serving as rests for the pile threads and arranged at different distances from the textile item or the pincer systems, the pile thread being carried in between, or against said parts during the process of bending. By other forms of construction for looms, the counterrest may, according to the invention, include a wall offering a resting plane for the pile thread, the said wall being provided, according to the invention, with a projection. According to the invention, the counterrest may consist of a bar alone.

According to the invention, the loom in question includes devices for carrying a bent pile thread through the textile shed in suitable manner by means of one or more gripping members.

The loom may, according to the invention, include one or more systems of gripping members for the conveying of the pile threads, which members within each system may be so arranged in series that the member or members, as a system or in series as required, probably at different points of time, are moved in relation to the yarns of the textile item, and the series of gripping members may include any desired number of gripping members arranged at any desired mutual distance, whereby abundant possibilities of variation are obtained.

The gripping systems may be moved independently of one another, probably in several, different directions, both in a direction at a right angle to, as well as longitudinally to, or across the threads of the textile shed.

The series of gripping members, usually of oblong form and stretching parallel to one another in the direction of the textile item, will frequently form comb-like devices when built together in any desired manner.

A system, or a series of gripping members comprising jaws, may consist of two comb-like members, which are movably connected to each other along their backs, direct or indirect, for instance by means of hinges or springs, and the pincers may be positioned that close to one another as to allow them to be introduced into each individual interval between the threads in one of the thread systems of the textile shed, or they may be placed at a larger distance to one another, so that a pincer, a pile thread respectively, can not be introduced into each individual interval.

According to the invention, the gripping members may often be carried through the textile item, before they grasp the pile threads. During their forward motion through the textile item, they may adjust the yarn of the latter in suitable manner. When a pair of mutually interdependent gripping members is employed for the grasping of each its own of the two ends of a pile thread, they may, as required, either push the warp threads in the two plies of a textile shed to the same side or individually take warp threads to each its own side, in which latter case the warp threads are crossed. In this way, knots, etc., of different nature may be tied, which is further explained below.

In the case of the pile threads being bent by the employment of a counterrest positioned at the textile item close to the transition from the textile shed to the woven cloth, the gripping members may take an active part in the entire process of bending. Thus, the pile thread may be carried forward and firmly held at one end during the process of bending, while the bending proper may probably be performed by the other gripping member, which preferably will not grasp the other end of the pile thread, until the bending is completed.

Suitably, the gripping members may frequently be pincers, the jaws of which may, according to the nature and dimensions of the thread and the loom, both be rigid or both elastic, or one jaw may be rigid and the other one elastic.

The gripping members may be placed to the same side of the textile shed as the yarn magazine, or they may be placed each to its own side of the textile shed. Instead of a yarn magazine, any other suitable yarn feeding device may be employed. A gripping system may be so constructed as to withdraw the pile threads, individually or in groups, from the yarn magazine.

According to the invention, the pincers may open and close chiefly in the longitudinal direction of the warp threads. They will thus only require a restricted space in the breadth direction of the textile item, whereby it will be possible to work with a great number of jaws beside one another and thus perform a close and rapid weaving.

Out of a pair of mutually interdependent gripping members, one member may be in the shape of a tube which, during its forward motion from one side of the textile shed, carries the pile thread through the latter, the pile thread being bent on the other side of the textile shed, whereafter it is carried into the latter, in order to be woven into it.

Suitably the pile thread, e. g. its central part, may be held by means of some holder. This may be expedient by portable gripping devices.

As it may not be suitable to admit the gripping members to perform too large movements, it will often be of advantage to divide up the necessary complete motion in the weft direction. This may be accomplished, according to the invention, by transferring a part of the movement to the counterrest bar. In such case, the bar may be designed as two parallel bars in such manner that one end of each pile thread is gripped by one bar and the other end by the other bar. When these bars are displaced in relation to one another, the pile threads will be offset. In some cases, the bisected counterrest bar may perform the complete, necessary movement, so that the gripping members will not have to perform any movement in the weft direction.

The offsetting of the pile threads above mentioned may also be accomplished through the employment of lamellae flanged or inclined per se.

A loom according to the invention may be provided with a number of contrivances in order to accomplish specific objects. Thus, the top- and bottom-jaws of the pincers in a pincer system may be displaceable in relation to one another, especially in their longitudinal direction, which may be of special importance in cases where the curving of the thread is performed by means of one of the jaws which is influenced to project forward of the other one during the process of bending. Additionally, the jaws may be so twisted as to occupy less space across the textile item, without the plane grasping the pile thread becoming too narrow. Frequently, it will be suitable that the jaws are kept closed during the conveying motion, so that they will not tangle the yarns of the textile item. The counterrest may have even or curved planes. The latter may often be better fitted to suit the qualities of the thread, so that the thread will be supported over a larger portion of its length, namely its bent part. The crossing of the threads of the textile item may be performed in any different manner than by means of the gripping members, such as by means of special combs the teeth of which may displace the threads of the textile item in relation to one another in suitable manner.

By means of looms of the present nature, it is possible to manufacture woven goods with Persian knots, Turkish knots or goods with simple, bent pile threads.

Figure 2:
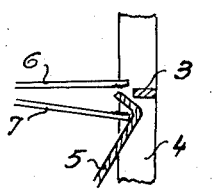
Figure 3:
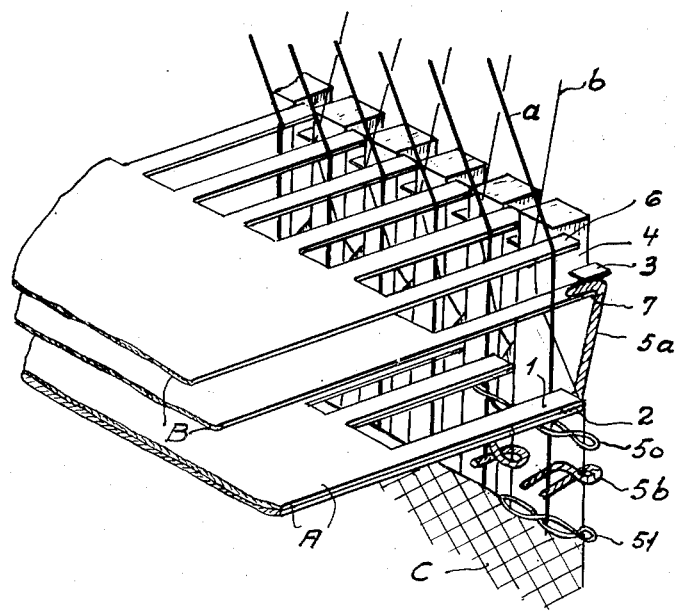

Some forms of construction for the arrangement of looms according to the invention are illustrated by way of example on the drawing, where Figures 1–3 show the principle for bending a pile thread against a special counterrest provided with lamellae, Figures 4–26, different forms of construction for counterrests, both stationary as well as portable, Figure 27, conveying chains carrying portable bars, Figures 28–33, tying of Persian and Turkish knots, and Figure 34, part of a textile item with loops.

The bending of a pile thread, especially in the case of stationary counterrests, may be performed by means of the bending device shown in Figures 1, 2, 3, which, for instance, may be employed when the gripping members and the yarn magazine are placed on each its own side of the textile item. A pincer, in the following called an A-pincer, with jaws 1 and 2 probably of equal length, is carried through the textile shed with warp threadplies *a, b*. A ready woven part of the item is indicated by *c*. The A-pincer is carried further in above a counterrest 3 placed between lamellae 4, where it has grasped one end of a pile thread part 5 projecting from a yarn magazine and drawn it rearwards over counterrest 3, whereafter it is carried downwards into the position shown in Figure 1. The pile thread is cut off at any suitable point of time. Another pincer, the jaws of which may be of different length, in the following called a B-pincer, is carried through the textile item and further forward in the direction of the counterrest, and its lower jaw pushes a part of the free end of pile thread 5 partly in below the counterrest, whereby the free end (see Figure 2), swings into the open jaws of the B-pincer, which latter thereupon closes on the thread end, so that the pile thread is now grasped at both ends and may be carried, by means of the pincers under their retracting motion, in through the textile item, where it is inter-woven by means of weft threads.

In Figure 3 is shown a part of a loom. C designates a woven part of the carpet and a and b warp threads. The pincers A with the jaws 1 and 2 have grasped the lower ends of the pile threads 5a, and the nether jaws 7 of the pincers B have pushed parts of the upper ends of the said pile threads under the counterrests 3 fixed between the laminae 4. The upper jaws of the pincers B are ready to close upon the said upper ends of the pile threads overhanging the counterrests. When the pincers B have been closed the pincers A and B will be drawn to the left on the figure, each on its own side of the crushed warp threads a and b. By this retraction of the pincers the ends of the pile threads are carried through the thread piles. The threads a and b are straightened out and the pile threads form Persian knots as shown by 5b. 50 is a designation for a weft thread.

Further bending devices for the pile thread are shown in the following figures.

Figure 4:
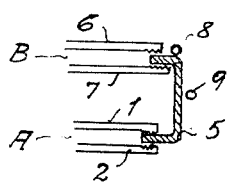

By the form of construction for a bending device shown in Figure 4, the counterrest consists of two bars 8 and 9, out of which one, as shown, may be placed farther to the rear than the other one. The A-pincer 1, 2 has, as described above, drawn the pile thread 5 over the bar 8 and carried it in front of bars 8 and 9, against which the B-pincer 6, 7 has bent and clamped the free end of the pile thread in a manner similar to that described above.

Figure 5:
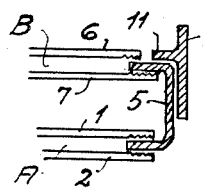

In the form of construction shown in Figure 5, the counterrest comprises a wall 10 with a projection 11. A-pincer 1, 2 has carried the pile thread 5 in front of wall 10, which serves as a resting plane for the thread, the end of the latter being bent by means of B-pincer 6, 7 in a manner similar to that described above.

Figure 6:
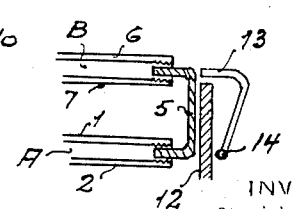

In Figure 6, a bending device is shown containing a smooth wall 12 serving as a resting plane for pile thread 5, the latter having been carried to the front of said wall by means of an A-pincer 1, 2. A pushing device 13, which in any suitable manner may be carried reciprocatingly in relation to the open B-pincer 6, 7 as the latter being at its advanced position, pushes the free end of pile thread 5 projecting above wall 12 into the open jaws of the B-pincer, which are nextly closed, whereby they will clamp the said end. The pushing device may, for instance, swing around an axis 14.

By the bending device shown in Figure 7, the counterrest comprises a bar 15, against which the A-pincer forces a pile thread to rest in a manner similar to that described above. Below bar 15 a pushing device 13, 14 is placed, of a nature similar to that shown in Figure 6. The method of operation is chiefly identical to that mentioned above.

By the bending device shown in Figure 8, the counterrest consists of two bars 16, 17, in front of which the A-pincer 1, 2 carries a pile thread 5. For the bending, a special bar 18 is employed, which is situated above the plane of the drawing in its idle position. When the pile thread, as above described, has been carried by means of A-pincer 1, 2 in front of the bars, the bar 18 is lowered that far, as to admit it to press the central part of the pile thread, by a motion to the right on the figure, in between bars 16, 17, whereby its free end is influenced to swing into the open jaws of B-pincer 6, 7, which are nextly closed on the free end of the pile thread.

By the form of construction for a bending device shown in Figures 9, 10, which is specifically employable with portable counterrests, a pile thread 5 is placed by means of a special member over a counterrest 19 substantially of U-shape and located between lamellae 4. Both ends of the pile thread are lying loose after being cut off. Two pincers of the B-type, which preferably have longer or extensible inner jaws 7, are carried through the yarns of the textile shed toward the pile thread, the said jaws bending each its own end of the pile thread and simultaneously grasping its free ends as shown in Figure 10.

By the form of construction shown in Figures 11 and 12, the pile thread is laid, by means of a special member over the counterrest in a manner similar to that employed with the latter form of construction. The said member consists of two parts 20, 21, directly hinged together, which in stretched position resembles a letter U, as they are provided at their free end with a pair of lamellae 22, 23, between which the pile thread 5 is placed to rest. When the two parts are folded more or less closely together, the pile thread will chiefly form a letter V. In this position, its two ends can be conveniently grasped each one by its A-pincer with jaws 1, 2.

As shown in Figures 13, 14, parts 22, 23, of the same nature as those shown in Figures 11, 12, may be interconnected by means of a special piece 24 to which they are individually hinged. By this form of construction the bent pile thread is arranged to form a letter U, which will often be an advantage, as it is thus better grasped by pincers.

An additional device for the bending of the pile thread by stationary counterrest is shown in Figures 15 and 16. The device may be employed when the gripping members and the yarn magazine are positioned at the same side of the textile item. In Figure 15 is shown how the pile thread 5, which projects out from, for instance, a tube 25, is carried from above in the figure down through a textile shed a, b. The already woven part of the cloth is indicated by c. From this position the tube 25 carries the pile thread over the counterrest 10, 11, where it is positioned between the lamellae 4, as shown in Figure 16. A pincer 6,7 of the B-type, one jaw 6 of which may be longer than the other one 7, bends the pile thread in cooperation with the projection 11 on the counterrest, whereafter the pincer and the tube will draw the bent pile thread 5 upwards through the shed, where it is interwoven in usual manner.

In Figures 17 and 18 a bending device is shown for the pile thread containing, for instance, a tube 25 and a part 30 pivotable on a shaft 29, the said part being provided with lamellae 31. Tube 25 carries the pile thread from above in the figure down through the textile shed a, b and places its free end inside the lamellae 31. Next, the part 30 swings upwards in the direction toward, possibly through, the textile shed a, b, where an A-pincer 1, 2, the jaws of which may be of equal length, grasps the free end of the pile thread.

In Figures 19, 20 is shown, in section, a bar, incidentally portable, or a chain link 32, which is provided with a groove of U-shape and carries lamellae 4. The bar or chain may be located at a special feeding station. By means of a feeding pincer with jaws 33, 34 a pile thread 5 is carried along between the lamellae where its central part is pressed by means of a plunger 35 down into the U-shaped groove. The plunger is retracted, once the pile thread has been located at its place. It will, however, frequently be suitable, previously to push the free ends of the pile thread, which may be curved in a way not desired, upwards along the sides of the plunger, in order to straighten the ends. On one side of the plunger this may be performed by means of one of the jaws 33, 34 of the feeding pincer during the upward motion of the latter, and on the other side of the plunger by means of a special smoothing device 36 previous to the retracting motion of the plunger. The straightening of the pile thread may also be performed by means of a stationary edge or by means of an air-current.

In Figure 21 is shown another form of construction for a bar or chain link where the lamellae are formed in a groove in bar 32, for instance by the cutting of small grooves or channels 37, in which the location of pile threads 5 is shown.

It is not always imperative that the lamellae be arranged on a groove of U-shape. They may, for instance, also be placed on a plane bar.

Lamellae with cuttings are shown in Figures 22, 23. In the opposite walls of a pair of interdependent lamellae 4 limiting the interspace between the two lamellae, grooves 26 are cut, into which pile threads 5 will place themselves when carried along in a suitable manner under a gentle pressure. The figures show that the ends and the central part of the pile thread are guided in these grooves. Frequently, it may be sufficient that only the ends are guided in the grooves.

Instead of grooves, also through-going cuts may be applied into which, for instance, the central part or the ends of the pile thread will position themselves. Such a cut 28 in a lamellae 4 is shown in Figure 24.

For the same purpose, projections 27 on the lamellae may, according to the invention, be advantageously employed for guiding the pile threads, such as shown in Figures 25–26.

After the pile threads have been placed into the bars or chains, the latter are carried in any suitable manner to the extraction position at the textile shed, so that one or two gripping members, which are carried through the latter, may grasp the pile thread at said position. As shown in Figure 27, the bars may, for instance, be mounted in parallel rows beside one another on two parallel, endless conveying chains 38 carrying the bars from the feeding station along to the extracting position at the textile shed.

Also other suitable conveying devices of any nature may be employed. The bars may, for instance, be pushed along in their longitudinal direction in a manner somewhat similar to that of carrying the U-shaped chain from the feeding station to the extracting position. The loose bars may be placed onto an inclined plane, along which they may slide down into the extracting position.

A tying of a Persian knot on a loom of the present nature is illustrated by way of example in Figures 28, 29, 30, 31. Two warp threads $a$, $b$ in a textile shed are incidentally crossed by means of two gripping members carried through the textile shed, or by means of other suitable members known per se, in such a manner that two stitch-like Figures 39, 40 are formed through which, during their retraction, the gripping members draw the two ends of a pile thread, the crossing being simultaneously cancelled. The forming of a Persian knot and the simultaneous straightening of the warp threads will need no further explanation.

The tying of a Turkish knot on a loom of the present nature is shown in Figures 32, 33. Two warp threads $a$, $b$, over which a Turkish knot is to be tied, are carried—without being crossed—to the same side in any suitable manner so that each of them will form an angle with legs 41, 42, and 43, 44 respectively. Two pincers of the A-type with jaws 1, 2 of equal length are carried upwards into the interspace between legs 42, 44 and outside legs 41, 43 where they grasp the two ends of a bent pile thread 5 positioned between two lamellae 4 on a bar 32. When being retracted, the pincers will carry the pile thread along, the latter riding with its central part on legs 41, 43, its two ends being led through the interspace between legs 42, 44. The Turkish knot will be formed when the pincers are completely retracted through the textile shed, and when the warp threads are returned to their original position. Weft threads serving the purpose of the weaving are indicated by 45, while the Turkish knots finally inter-woven are indicated by 46.

The same system may also be applied for the tying of Persian knots, provided the threads are crossed, for instance by means of the pincers.

In Figure 34 are shown V-shaped loops 47 formed over a special, not yet beaten up weft thread 48, while weft threads serving the purpose of weaving are indicated by 49. Warp threads in the textile shed are indicated by $a$, $b$. The V-shaped loops may also be formed over warp threads.

Having thus described our invention what we claim is:

1. In a loom for weaving textile fabrics with pile threads of the kind where the pile threads are looped solely by mechanical means independent of the shed and of the textile fabric being woven, the combination which comprises a support for the pile thread adjacent the shed, means cooperating with said support to bend said pile thread into a loop on said support prior to the introduction thereof into the shed, the ends of the loop being bent to point in the direction of said shed and being maintained in its looped form by said support, and gripping means adjacent the shed for gripping at least one end of said loop and drawing it into the shed.

2. In a loom for weaving textile fabrics with pile threads of the kind where the pile threads are looped solely by mechanical means independent of the shed and of the textile fabric being woven, the combination which comprises a support for the pile thread adjacent the shed, means cooperating with said support to bend said pile thread into a loop on said support prior to the introduction thereof into the shed, the ends of the loop being bent to point in the direction of said shed and being maintained in its looped form by said support, and gripping means adjacent the shed for gripping at least one end of said loop and drawing it into the shed, substantially in the longitudinal direction of movement of said gripping means.

3. Apparatus according to claim 2 in which the pile thread is frictionally held on said support while being looped.

4. Apparatus according to claim 2 in which the pile thread is mechanically held on said support while being looped.

5. Apparatus according to claim 2 in which said support comprises a counterrest having spaced plates supported thereon, the plates being spaced a distance apart from one another so as to frictionally support a pile thread therebetween.

6. Apparatus according to claim 2 in which the support comprises a channel member with spaced plates supported transversely thereof above the channel, said plates being spaced a distance apart from one another sufficient to frictionally support a pile thread therebetween.

7. Apparatus according to claim 2 in which the support comprises a counterrest having an angular form, with one long and one short leg in cross section, and having spaced plates fixed thereon transversely thereof, said plates being spaced a distance apart sufficient to frictionally support a pile thread therebetween.

8. Apparatus according to claim 2, in which the support comprises a counterrest bar having spaced, parallel, coplanar plates pivoted thereto on each side thereof, respectively, for swinging in a vertical plane, the plates on each side being spaced a distance apart from one another sufficient to frictionally support a pile thread therebetween.

9. Apparatus according to claim 2 in which the support comprises a counterrest bar U-shaped in cross section, having spaced plates supported across said bar, said plates being spaced a distance apart sufficient to frictionally support a pile thread therebetween, the bight of the loop formed being supported in the U-shaped portion of said bar.

10. Apparatus according to claim 2, in which said gripping means comprises a first pincer for gripping one end of the loop and a second pincer for gripping the second end of the loop.

11. Apparatus according to claim 2, in which said gripping means comprises a part of said bending means 12. Apparatus according to claim 2, in which said supporting means comprises a part of said bending means.

13. Apparatus according to claim 2, in which said gripping means comprises at least one pincer and in which one jaw of said pincer comprises a bending means.

14. Apparatus according to claim 2 in which said gripping means comprises pincers and in which said bending means comprises a jaw of said pincers, said jaw being of greater length than the other jaw thereof.

15. Apparatus according to claim 2, in which said gripping means comprises pincers, the jaws of said pincers being displaceable with respect to one another in their longitudinal direction.

16. Apparatus according to claim 2, in which said bending and gripping means comprises a tube which supports one end of the pile thread.

17. Apparatus according to claim 2, in which said gripping means comprises the combination of a tube and a pincer, each one, respectively, gripping one end of the pile thread, with a jaw of said pincer comprising a bending means.

18. Apparatus according to claim 2, in which said gripping means comprises the combination of a tube and a pincer, each one, respectively, gripping one end of the thread, with the tube comprising a bending means.

19. Apparatus according to claim 2, in which the bending means comprises a plunger.

20. Apparatus according to claim 2, in which the support comprises a counterrest bar U-shaped in cross section, having spaced plates supported across said bar, said plates being spaced a distance apart from one another sufficient to frictionally support a pile thread therebetween, and in which the bending means comprises a plunger, the bight of the loop formed being supported in the U-shaped portion of said bar.

21. In a loom for weaving pile fabrics in which the pile threads are permanently looped independently of the textile shed and the textile fabric prior to the introduction of said pile thread into the shed, the combination of means comprising a pile thread feeding station adjacent the shed, a counterrest adjacent said feeding station, a first gripping means gripping one end of a pile thread and drawing it over the counterrest, a second gripping means, part of said second means engaging said thread and bending it over the counterrest, said second means gripping the free end of said bent thread, said combined gripping means forming said thread into a loop and drawing it into the shed for weaving into the fabric.

22. In a loom for weaving pile fabrics in which the pile threads are permanently looped independently of the textile shed and the textile fabric prior to the introduction of said pile thread into the shed, the combination of means comprising a pile thread feeding station adjacent the shed, a counterrest adjacent said feeding station, a first gripping means gripping one end of a pile thread and drawing it over the counterrest, a second gripping means engaging the free end of said thread and bending it over said counterrest so that the free end may be gripped, said combined gripping means, each holding one end of said thread, forming it into a loop and drawing it, substantially in the longitudinal direction of movement of said gripping means, into the shed for weaving into the fabric.

23. In a loom for weaving pile fabrics in which the pile threads are permanently looped independently of the textile shed and the textile fabric prior to the introduction of said pile thread into the shed, the combination of means comprising a pile thread feeding station adjacent the shed on one side thereof, a counterrest adjacent said feeding station, a first gripping means on the other side of said shed, said gripping means gripping one end of a pile thread from the feeding station and drawing it over the counterrest, a second gripping means cooperating with said first gripping means and engaging the free end of said thread to bend same over the counterrest so that the free end may be gripped by said second means, said combined gripping means drawing said pile thread into a loop and into the shed for weaving into the fabric.

24. In a loom for weaving textile fabrics with pile threads of the kind where the pile threads are looped solely by mechanical means independent of the textile shed and of the textile item being woven, the combination which comprises a series of movable supports for the pile thread adjacent the shed, means cooperating with each support to bend said pile thread into a loop on said support prior to the introduction thereof into the shed, the ends of the loop being bent to point in the direction of the shed and being maintained in its looped form by said support, gripping means adjacent the shed for gripping each end of said loop, said supports being periodically moveable into the path of the gripping means whereby the pile thread carried thereby may be gripped and drawn into the shed.

25. The method of weaving textile fabrics comprising the steps of bending a pile thread into a loop prior to the introduction of said loop into the shed, mechanically supporting the loop so formed adjacent the shed, moving a gripping means longitudinally toward said thread and gripping the ends of the loop in such a manner that said ends are supported substantially in the longitudinal direction of movement of said gripping means, said gripping means drawing said thread in looped form into the shed to be woven into the fabric.

26. The method of weaving textile fabrics with pile threads of the kind where the pile threads are looped solely by mechanical means independent of the shed and of the textile item being woven, which comprises providing a support for the pile thread adjacent the shed, bending said thread into a loop on said support prior to the introduction thereof into said shed while pointing the ends of the loop in the direction of said shed, providing gripping members for the ends of said loop and gripping and drawing said loop into the shed substantially in the longitudinal direction of movement of said gripping members.

SVEND SIGURD CHRISTIE FLEISCHER.
CHRISTEN CARL THOMSEN.

REFERENCES CITED

The following references are of record in the file of this patent:

UNITED STATES PATENTS

| Number | Name | Date |
| --- | --- | --- |
| 1,208,528 | Entwisle | Dec. 12, 1916 |
| 1,850,984 | Morton | Mar. 22, 1932 |
| 2,074,027 | Rice | Mar. 16, 1937 |
| 2,094,375 | Rice | Sept. 28, 1937 |
| 2,293,561 | Robb | Aug. 18, 1942 |
| 2,324,564 | Dacey | July 20, 1943 |